US012343982B2

(12) United States Patent
Mayr et al.

(10) Patent No.: US 12,343,982 B2
(45) Date of Patent: Jul. 1, 2025

(54) INKJET PRINTING DEVICE FOR PRINTING WITH INK TO A RECORDING MEDIUM IN THE FORM OF A WEB

(71) Applicant: Canon Production Printing Holding B.V., Venlo (NL)

(72) Inventors: Stefan Mayr, Reichertshausen (DE); Mehrad Biglari, Munich (DE); Stephan Pilsl, Röhrmoos (DE)

(73) Assignee: Canon Production Printing Holding B.V., Venlo (NL)

( * ) Notice: Subject to any disclaimer, the term of this patent is extended or adjusted under 35 U.S.C. 154(b) by 150 days.

(21) Appl. No.: 18/283,599

(22) PCT Filed: Mar. 16, 2022

(86) PCT No.: PCT/EP2022/056823
§ 371 (c)(1),
(2) Date: Sep. 22, 2023

(87) PCT Pub. No.: WO2022/200147
PCT Pub. Date: Sep. 29, 2022

(65) Prior Publication Data

US 2024/0165968 A1 May 23, 2024

(30) Foreign Application Priority Data

Mar. 25, 2021 (DE) ..................... 10 2021 107 461.4

(51) Int. Cl.
*B41J 11/00* (2006.01)
*B41J 2/165* (2006.01)
(Continued)

(52) U.S. Cl.
CPC ..... *B41J 11/00216* (2021.01); *B41J 2/16517* (2013.01); *B41J 15/08* (2013.01); *B41J 29/377* (2013.01)

(58) Field of Classification Search
CPC .. B41J 11/00216; B41J 2/16517; B41J 15/08; B41J 29/377; B41J 11/0024;
(Continued)

(56) References Cited

U.S. PATENT DOCUMENTS

| | | |
|---|---|---|
| 6,246,856 B1 | 6/2001 | Kopp et al. |
| 2002/0044168 A1 | 4/2002 | Hashi et al. |

(Continued)

FOREIGN PATENT DOCUMENTS

| | | |
|---|---|---|
| DE | 102013106211 B4 | 5/2015 |
| DE | 102019110115 A1 | 10/2020 |

(Continued)

*Primary Examiner* — Bradley W Thies
(74) *Attorney, Agent, or Firm* — The Webb Law Firm

(57) ABSTRACT

An inkjet printing device for printing to a recording medium includes a printing unit that has a plurality of print bars that respectively have one or more print heads. The printing device also includes a transfer printing sled to guide the recording medium, which can be moved into and out of a space below the printing unit. In a print operation state, the transfer printing sled is arranged in the space and guides the recording medium during printing. In a maintenance operation state, the transfer printing sled is moved out of the space. The printing device also includes at least one cleaning element for cleaning at least one print head of the printing module.
In the transport direction of the recording medium, the at least one cleaning element is arranged laterally next to the space in the print operation state and in this space in the maintenance operation state.

13 Claims, 5 Drawing Sheets

(51) Int. Cl.
*B41J 15/08* (2006.01)
*B41J 29/377* (2006.01)

(58) Field of Classification Search
CPC .... B41J 2/16508; B41J 2/16535; B41J 15/06; B41J 2/16547; B41J 2/16544; B41J 11/002; B41J 29/02; B41J 29/13; B41J 29/14; B41J 2/16552; B41J 2002/16558; B41J 2/16585
See application file for complete search history.

(56) References Cited

U.S. PATENT DOCUMENTS

| | | | |
|---|---|---|---|
| 2009/0122107 | A1 | 5/2009 | Ray et al. |
| 2009/0141069 | A1 | 6/2009 | Yamamoto |

FOREIGN PATENT DOCUMENTS

| | | | | |
|---|---|---|---|---|
| JP | 201713237 | A | | 1/2017 |
| JP | 2017013237 | A | * | 1/2017 |
| WO | 9839691 | A1 | | 9/1998 |

* cited by examiner

INKJET PRINTING DEVICE FOR PRINTING WITH INK TO A RECORDING MEDIUM IN THE FORM OF A WEB

CROSS-REFERENCE TO RELATED APPLICATIONS

This application is the United States national phase of International Application No. PCT/EP2022/056823 filed Mar. 16, 2022, and claims priority to German Patent Application No. 10 2021 107 461.4 filed Mar. 25, 2021, the disclosures of which are hereby incorporated by reference in their entireties.

BACKGROUND OF THE DISCLOSURE

Field of the Disclosure

The disclosure relates to an inkjet printing device for printing with ink to a recording medium in the form of a web. The printing device comprises a printing unit having a plurality of print bars that respectively have one or more print heads, and a transfer printing sled that can be moved into and out of a space below the printing unit to guide the recording medium. In a print operation state, the transfer printing sled is arranged in the space and guides the recording medium upon printing. In a maintenance operation state, the transfer printing sled is moved out of the space between printing unit and cleaning unit.

Description of Related Art

Such a printing device with transfer printing sled is known in particular from the document DE 10 2013 106 211 B4. However, the printing device disclosed there has the disadvantage that, in the print operation mode, the cleaning unit is arranged below the transfer printing sled and must be moved upward for cleaning of the print heads in the maintenance operation mode. This requires a relatively large amount of installation space in terms of height.

From the document WO 98/39691A1, a printing or copying apparatus for printing to a recording medium in the form of a web is known in which a plurality of modules and assemblies are provided. The printing or copying apparatus thus has an electrophotography module and a respective transfer module on both sides of a transport channel.

SUMMARY OF THE DISCLOSURE

The disclosure is based on the object of specifying an inkjet printing device that is of simple and modular design and requires only a relatively small installation space.

This object is achieved via an inkjet printing device having the features as described herein. Advantageous developments of the disclosure are specified as described herein.

Via an inkjet printing device having the features as described herein, it is achieved that, in the print operation mode, the recording medium to be printed is correctly positioned with the aid of the around the printing sled and, in the maintenance operation state, the space below the printing unit is free so that the at least one cleaning element arranged laterally beside the space in the print operation state is arranged in the space below the printing unit in the maintenance operation state, and there can clean the print heads of the printing unit that are arranged above the space. The cleaning elements can thereby comprise spraying and/or wiping elements. The soil particles that are thereby released and/or cleaning fluid dripping down can then be captured in a collection pan arranged below the space. A simple cleaning of the print heads is hereby possible without a great deal of installation space, in terms of height, being required for this. This is achieved in particular via the arrangement of the at least one cleaning element laterally next to the space in the print operation state.

The space is in particular located immediately below the printing unit. In the print operation state, the transfer printing sled of the saddle module serves in particular as a printing saddle for positioning the recording medium opposite the print heads of the printing unit. The recording medium in the form of a web can thereby at least partially wrap around the transfer printing sled, both in the print operation state and in the maintenance operation state.

In the print operation state, the transfer printing sled can also be arranged at least partially above a buffer module for buffering a portion of the recording medium. A region for buffering a portion of the recording medium in the buffer module is preferably arranged below the collection pan for capturing soil particles and/or cleaning fluid in the maintenance operation state.

BRIEF DESCRIPTION OF THE DRAWINGS

The terms Fig., Figs., Figure, and Figures are used interchangeably in the specification to refer to the corresponding figures in the drawings.

Further features and advantages result from the following specification, which explains embodiments in more detail using accompanying Figures. Shown are.

DESCRIPTION OF NON-LIMITING EMBODIMENTS OF THE DISCLOSURE

Figure 1:
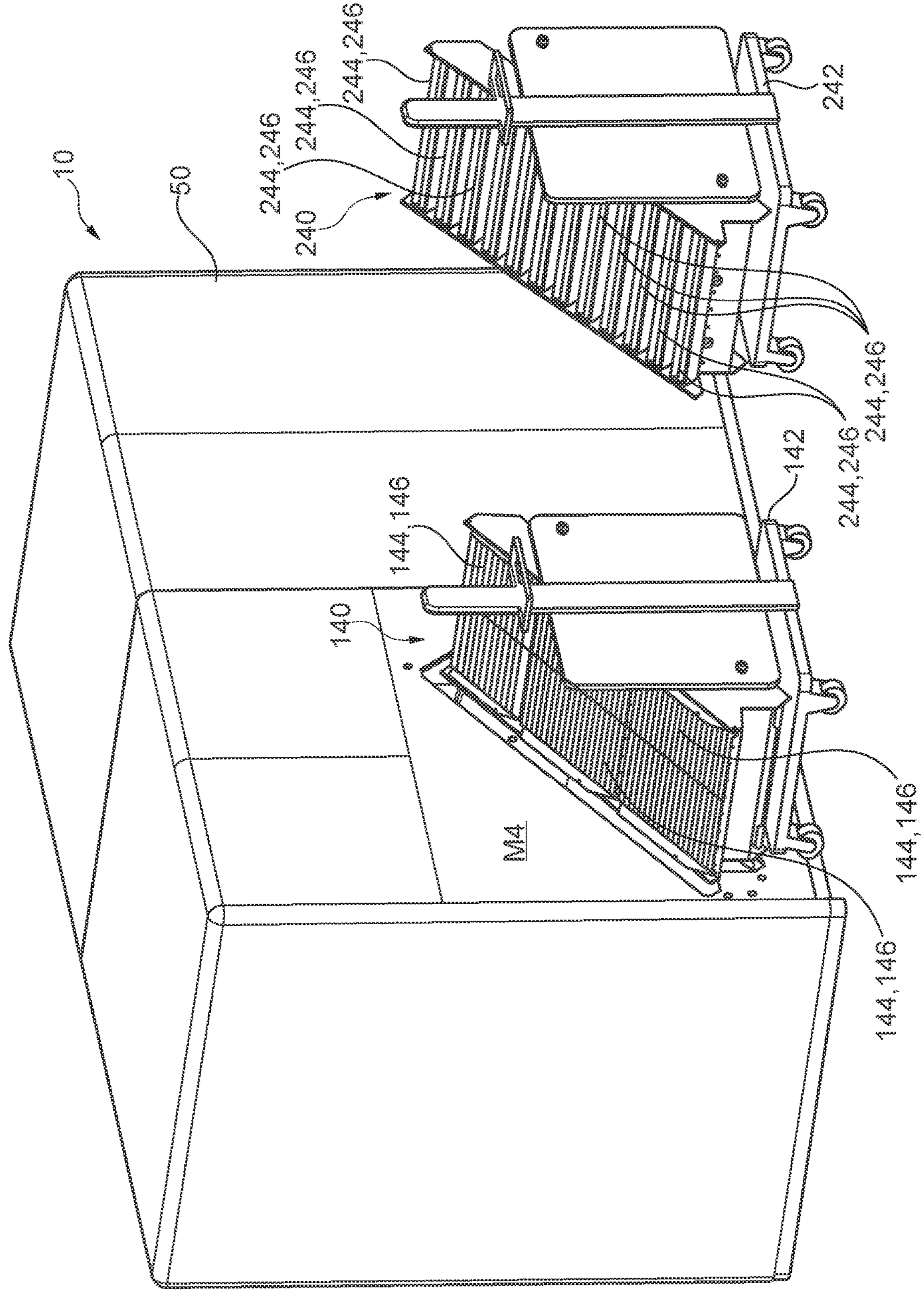
FIG. 1 a perspective view of an inkjet printing device for printing with ink to a recording medium in the form of a web, with two alternatively usable drying units of a drying module.

FIG. 1 shows a perspective view of an inkjet printing device 10 for printing with ink to a recording medium in the form of a web, with two drying units 140, 240 of a drying module M4 that can be used alternatively in the inkjet printing device 10. The inkjet printing device 10 is in particular a high-capacity printer that can print to the recording medium 12 depicted in FIG. 3 at high speed, typically up to 3 m/s, in multicolor operation. Paper, packaging material, textile material, cardboard, films of plastic and/or metal, and/or hybrid material, for example plastic or metal regions in paper, can be provided as a recording medium 12.

A housing 50 of the inkjet printing device 10 is opened in the region of the drying module M4 so that, for example, the drying unit 140 can be removed from the drying module M4 and be placed on a transport cart 142 and another drying unit 240 can be inserted into the drying module M4, or vice versa. The drying unit 140 comprises contact heating elements 144 that preferably comprise a heating saddle via which the recording medium (preferably in the form of a web) is guided so that this contacts the surface of said heating saddle. The heating elements 144 are arranged on the front side of the drying unit 140, which is angled sloping downward in the transport direction of the recording medium. At least one further contact heating element 144 and/or at least one cooling element to cool the recording medium may be arranged on the rear side of the drying unit 140, past which the recording medium is subsequently directed on an upward slope. The drying unit 240 comprises at least one radiant heating element 244, in particular an IR radiant heating element 244, past which the recording medium is directed for drying of the ink applied upon printing. In the drying unit 140 as well, the heating elements 244 are arranged on the front side of the drying unit 240, which is angled sloping downward in the transport direction of the recording medium. At least one further radiant heating element 244 and/or at least one cooling element to cool the recording medium may be arranged on the rear side of the drying unit 240, past which the recording medium is subsequently directed on an upward slope.

Figure 2:
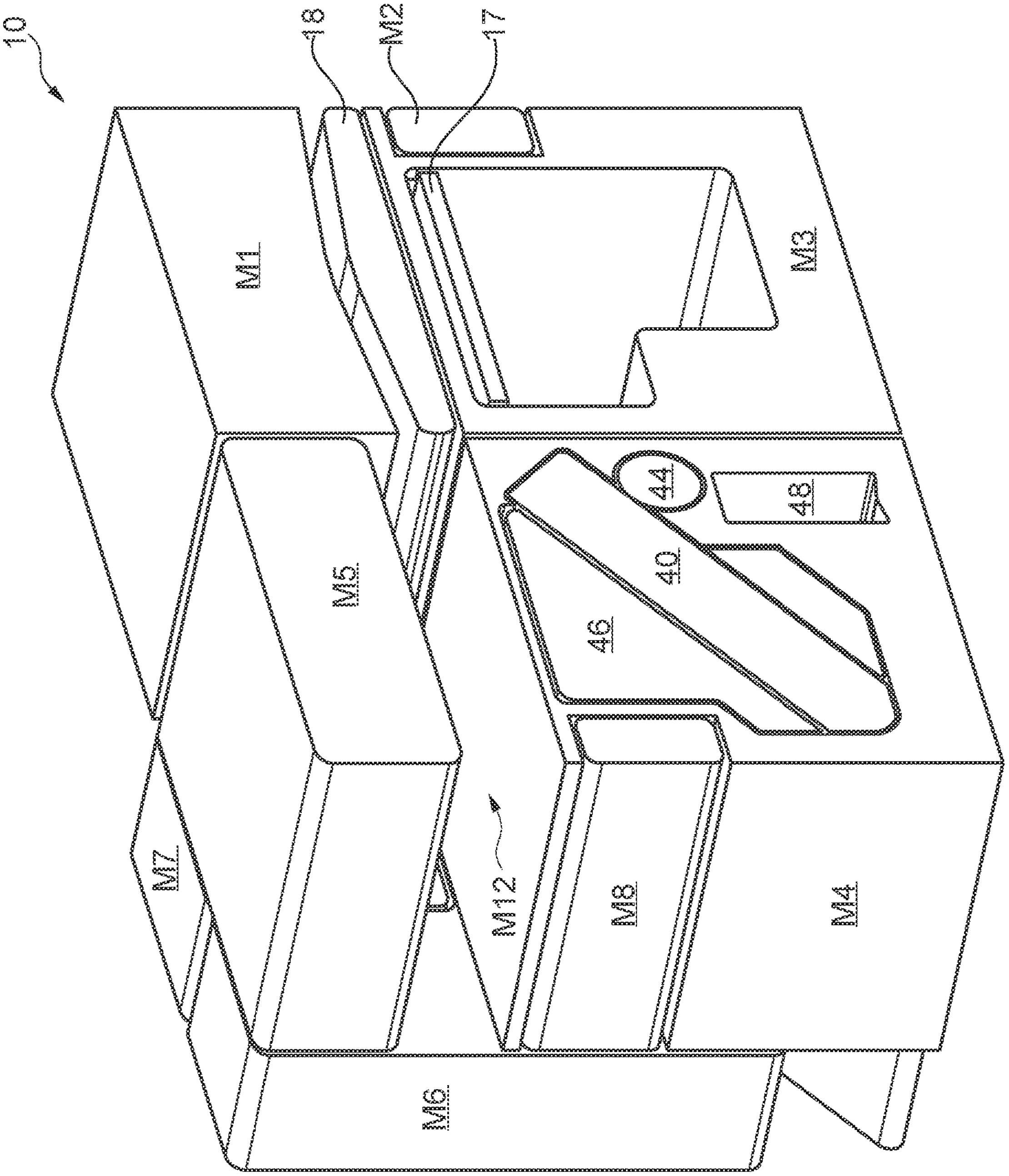
FIG. 2 a schematic view of modules of the inkjet printing device according to FIG. 1, from a first perspective.
Figure 3:
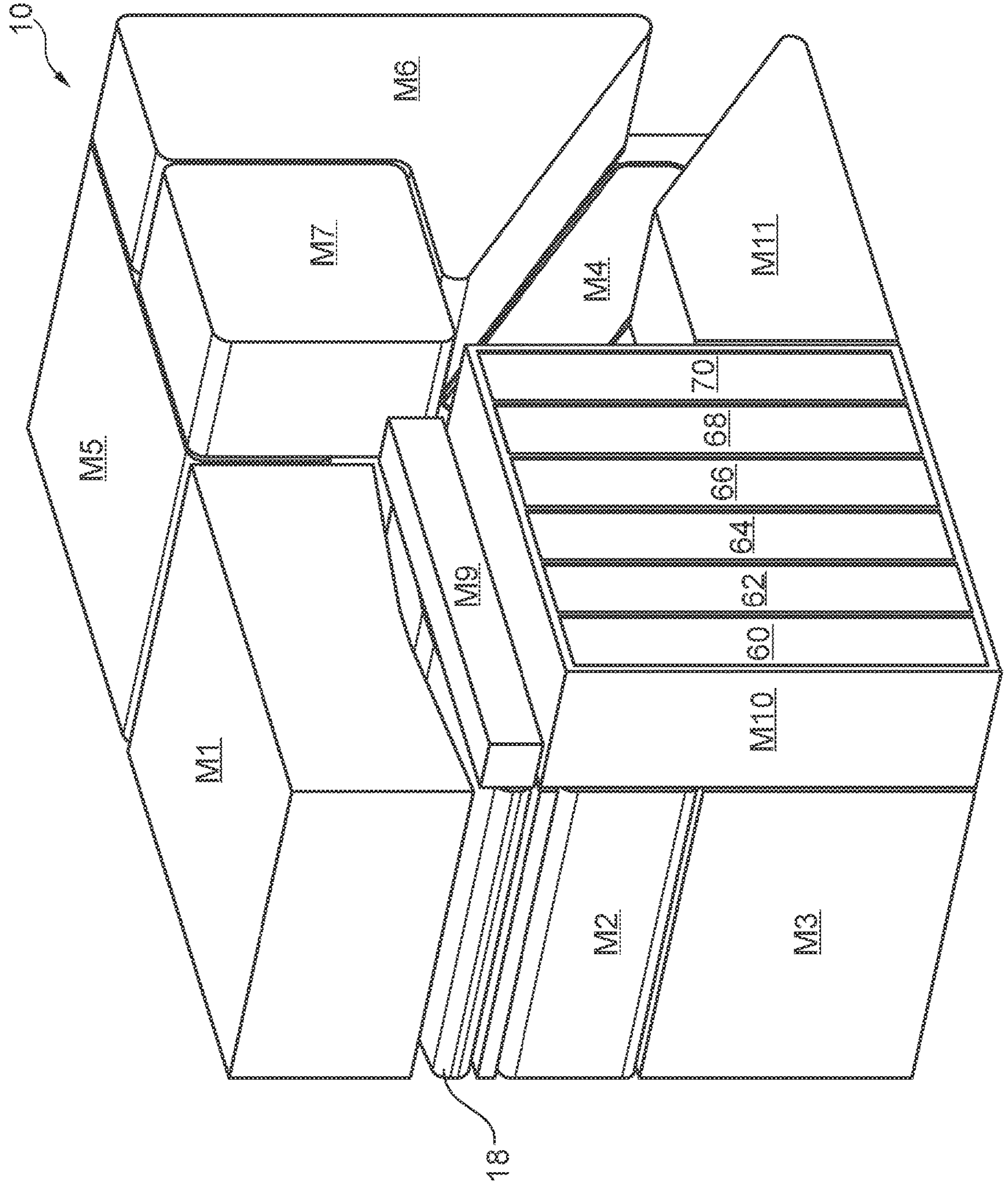
FIG. 3 a schematic view of modules of the inkjet printing device according to FIG. 1, from a second perspective.

FIG. 2 shows a schematic view of the structural units of the inkjet printing device 10 according to FIG. 1 from a first perspective, and FIG. 3 shows them from a second perspective, wherein the same elements and/or elements having the same function have the same reference character. The drying unit used in the inkjet printing device 10 is generally designated with the reference character 40 and is either the drying unit 140 or the drying unit 240.

In addition to the drying module M4, the inkjet printing device 10 comprises a printing module M1 with print bars that respectively comprise a plurality of print heads; a traction module M2 to supply the recording medium to be printed to, said recording medium being in the form of a web, to the inkjet printing device 10; a buffer module M3 to buffer a portion of the recording medium, for example given a print interruption; an electrical module M4 having a power part to supply power to the further modules, and preferably to a control unit to control and/or monitor the electrical module M5 and/or further modules; an air evacuation module M6; a cooling module M7 to cool the print heads of the print bars of the printing module M1; a traction module M8 to output the printed recording medium; a cleaning module M9 with cleaning elements for cleaning print heads of the printing module M1; a fluid management module M10 to handle the ink, the primer, and/or the residual ink as well as the cleaning fluid; a cooling module M11 to cool the recording medium after the drying; as well as a saddle module M12 with a transfer printing sled. Upon printing in a print operation state of the inkjet printing device 10, the recording medium is guided via the transfer printing sled 18, arranged opposite the print heads, so that the transfer printing sled 18 serves as a printing saddle in the print operation state. The design of the saddle module M12 and the function of the transfer printing sled 18 is explained in further detail in the following in connection with FIG. 4.

The cleaning module M9 is arranged laterally next to the saddle module M12 and comprises, as a cleaning element, at least one spraying and/or wiping element that, in a print operation state, are arranged laterally next to the transfer printing sled 18 of the saddle module M12, and thus laterally next to the printing module M1. In a maintenance operation state, the at least one spraying and/or wiping element is moved into the region below the printing module M1 in order to clean the print heads of the printing module M1 in a manner known per se.

The arrangement of the printing module M1 above the saddle module M12, the arrangement of the cleaning module M9 laterally next to the saddle module 12, and/or the arrangement of the fluid management module M10 below and preferably laterally next to the printing module M1 is optimal with regard to a modular design of an inkjet printing device 10 as shown in FIGS. 1 through 3. The module M10 in particular handles fluids such as ink in the regions 60 through 66, primer in the region 68, and cleaning fluid in the region 70, as well as residual ink.

The post-processing of the recording medium, in particular via the drying module M4 and/or the image detection of the printed image, in particular with the aid of an inline line camera, takes place spatially separately from the printing module M1 and spatially separately from the regions in which fluids are handled, such as the fluid management module M10. A simple modular design, with greater flexibility in the embodiment of the individual modules of the inkjet printing device 10, is hereby achieved.

Figure 4:
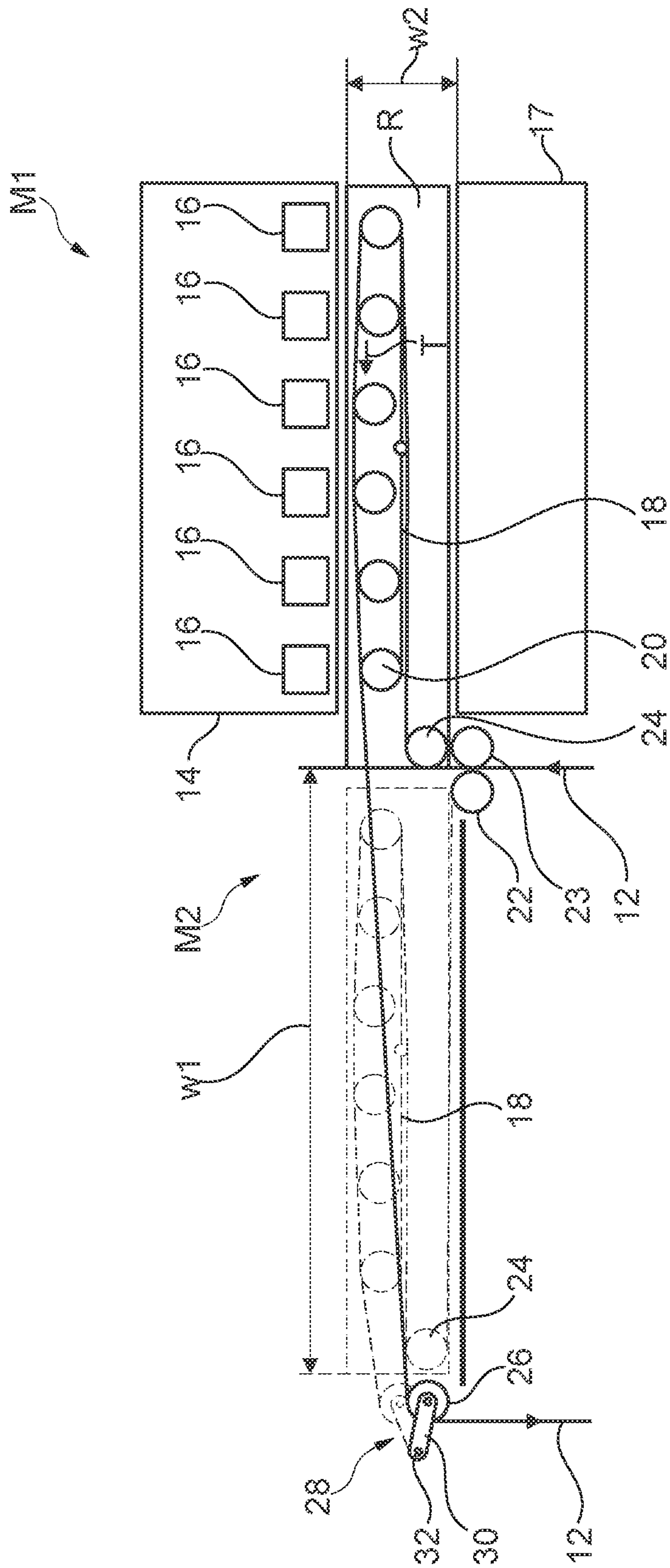
FIG. 4 a detailed side view of modules of the inkjet printing device according to FIG. 1.

FIG. 4 shows a detailed side view of modules M1 and M12 of the inkjet printing device 10 for printing with ink to a recording medium 12 in the form of a web. The arrows on the recording medium 12 indicate its transport movement T.

The printing module M1 comprises a printing unit 14 in which are arranged a plurality of print bars 16 that respectively print color separations of a primary color such as, for example, yellow, cyan, magenta, black. The print bars 16 extend over the entire width of the recording medium 12 and can have one or more print heads from the nozzles of which ink droplets are ejected onto the recording medium 12. In a print operation state, the print bars 16 are stationary and the recording medium 12 is moved forward below the printing unit 14 along a transport direction T. Arranged below the printing unit 14 is a collection pan 17 to capture cleaning fluid and soil particles in the cleaning of the print heads of said printing unit 14 in a maintenance operation state.

The transfer printing sled 18 of the saddle module, which contains a plurality of rollers 20 (only one is designated) to guide the recording medium 12, is arranged in a space R with height w2 between printing unit 14 and collection pan 17. The transfer printing sled 18 is borne so as to be movable. In the shown print operation state, the transfer printing sled 18 is driven into the space R so that the recording medium 12 is situated opposite the various print bars 16 and can be printed to with ink. In this state, the recording medium 12 forms a loop open to the left and is supplied to the rollers 20 via a roller pair, with rollers 22 and 23, and a deflection roller 24.

In the print operation state, the recording medium 12 is carried away via a further deflection roller 26 and supplied to subsequent modules, for example the buffer module and/or the drying module M4.

The transfer printing sled 18 is borne so as to slide, for example guide rails (not shown), and can be slid leftward into a maintenance position (shown with dashed line) to set the maintenance operation state, wherein it travels the path w1. The deflection roller 24 is hereby moved along with the transfer printing sled 18 so that the length of the loop of the recording medium 12 around the transfer printing sled 18 is essentially maintained. Only at the left end of the loop is it apparent that a certain length difference of the loop can arise between print operation state and maintenance operation state. This is compensated for with the aid of a compensation device 28, given which the deflection roller 26 is pivoted about a pivot axis 32 and raised with the aid of a lever arm 30 in order to compensate for this length difference.

The stationary deflection roller 22 which deflects the recording medium 12 also serves for length-neutral compensation. With the aid of the compensation device 28, the movement of the transfer printing sled 18 is overall neutralized in terms of length so that, after the deflection roller 26 and before the rollers 22 and 23, the recording medium 12 experiences no position change due to this movement. The length of the wrap of the recording medium 12 remains constant between the rollers 22, 23 and the deflection roller 26. This is very advantageous, because in this way the recording medium 12 is supplied to a downstream drying unit 40 without length variation or position variation. A duplicate drying of portions is thereby avoided. Even given a changing from print operation state to maintenance operation state and back into print operation state, no length change or position change results, which leads to a continuous and uniform operating process. The rollers 22, 23, 24, 20, 26 are free-wheeling, in order to prevent a tearing of the recording medium 12.

Further cleaning elements (not shown) of the cleaning module M9—such as, for example, blade, wiping elements, and/or sealing caps for the print bars 16—are arranged laterally next to the space R in the print operation state. In the maintenance operation state, at least a portion of these cleaning elements are moved into the space R to clean the print heads.

In the arrangement shown in FIG. 4, the transfer printing sled 18 is moved leftward in the transport direction T to set the maintenance operation state. In other embodiments, it is also possible to move the transfer printing sled 18 rightward, counter to the transport direction T, to set the maintenance operation state.

All massive units and modules of the inkjet printing device 10, in particular the printing unit 14, can be fixedly installed. Only a few elements need to be moved, for example cleaning elements of the cleaning unit 17 and the transfer printing sled 18.

In particular in the printing unit 14, no or only small loops are required for movement compensation for various connection lines, such as electrical lines for data transfer, sensor electronics, actuating electronics, optoelectrical data buses etc., and hoses for ink supply, cooling lines etc. The connection lines are optimally short, stationary, and can be relocated without a cable carrier.

A simple and compact design of the inkjet printing device 10, in particular of the modular design of the inkjet printing device 10 as explained in connection with FIGS. 1 through 3, is possible via the arrangement of the transfer printing sled 18 between collection pan 17 and printing unit 14 in the print operation state, and the arrangement of cleaning elements laterally next to the transfer printing sled 18 in the print operation state.

Relatively small drives and simple guide rails are sufficient for the movement of the transfer printing sled 18 and of the cleaning elements. The technical expenditure, even for a possibly necessary cable carrier, is comparably small for the necessary connection lines for the movable transfer printing sled 18 and the moveable cleaning elements.

The printing unit 14 of the printing module M1, in particular the print bars, are arranged stationary both in the print operation state and in the maintenance operation state of the inkjet printing device 10. The electrical and/or fluid lines connected to the printing unit 14 can thereby also be arranged stationary in the housing 50 of the inkjet printing device 10. These electrical and/or fluid lines are not moved in the transition from print operation state and maintenance operation state, and thus their position does not vary.

In the maintenance operation state, the transfer printing sled 18 can be arranged at least partially above a drying unit 40, 140, 240 of the drying module M4 for drying the recording medium 12 printed to with the aid of the printing unit 14 of the printing module M1.

The drying module M4, in particular the drying unit 40, 140, 240, comprises a cooling unit 44 having at least one cooling element to cool the recording medium 12 after it passes the heating element 144, 244.

As was already mentioned, the drying unit 40, 140, 240 comprises at least one heating element 144, 244. An emission region 146, 246 of the heating element 144, 244 is angled sloping downward and/or upward in the transport direction T of the recording medium 12, so that the emission region 146, 246 intersects a horizontal plane, preferably at an angle in the range of from 30° to 60°, in particular at an angle in the range of from 40° to 50°.

The emission region 146, 246 of a heating element 144, 244 in generally in particular the plane in which the heating element 244 emits thermal radiation, or in which a contact region is arranged for contacting a heating element 140, executed as a contact heating element 140, with the recording medium 12 to be dried. The contact region of the contact heating element 140 is preferably formed by a heating saddle across which the recording medium 12 is guided.

The emission region 146, 246 is thus arranged neither vertically nor horizontally in the transport direction T of the recording medium 12, but rather preferably in an inclined plane. In the transport direction T of the recording medium 12, the start of the emission region 146, 246 has a different height than the end of the emission region 146, 246.

For drying, the recording medium 12 is moved, at least in the region of the heating element 144, 244, along its emission region 146, 246 or parallel to its emission region 146, 246.

It is particularly advantageous if the heating element 144, 244 comprises a first heating element 144, 244 having a first emission region 146, 246, and if the drying unit 40, 140, 240 comprises at least one second heating element 144, 244 having a second emission region 146, 246. The first emission region 146, 246 can thereby be arranged on a front side of the drying unit 40, 140, 240, and the second emission region 146, 246 can thereby be arranged on a back side of the drying unit 40, 140, 240. The recording medium 12 can then first be directed past the front side of the drying unit 40, 140, 240, preferably downward at an angle, and subsequently be directed past the back side of the drying unit 40, 140, 240, preferably upward at an angle.

The emission region 146, 246, or the first emission region 146, 246 and/or second emission region 146, 246 drying unit 40, 140, 240, can travel along or parallel to a diagonal of the drying module M4.

Alternatively or additionally, it is particularly advantageous if the at least one heating element 144, 244 is arranged at the front side of the drying unit 40, 140, 240 and the at least one cooling element is arranged at the back side of the drying unit 40, 140, 240, wherein the recording medium 12 is first directed past the front side of the drying unit 40, 140, 240, preferably downward at an angle, and is subsequently directed past the back side of the drying unit 40, 140, 240, preferably upward at an angle.

In addition or as an alternative to the cooling element, in the drying module M4 a cooling roller can also be arranged across which the recording medium 12 is guided after passing the heating element 144, 244.

An exhaust arrangement or an exhaust channel to exhaust air from the region of the drying unit 40 can be arranged above the at least one heating element 144, 244, or laterally offset above the at least one heating element 144, 244, of the drying unit 40, 140, 240.

Figure 5:
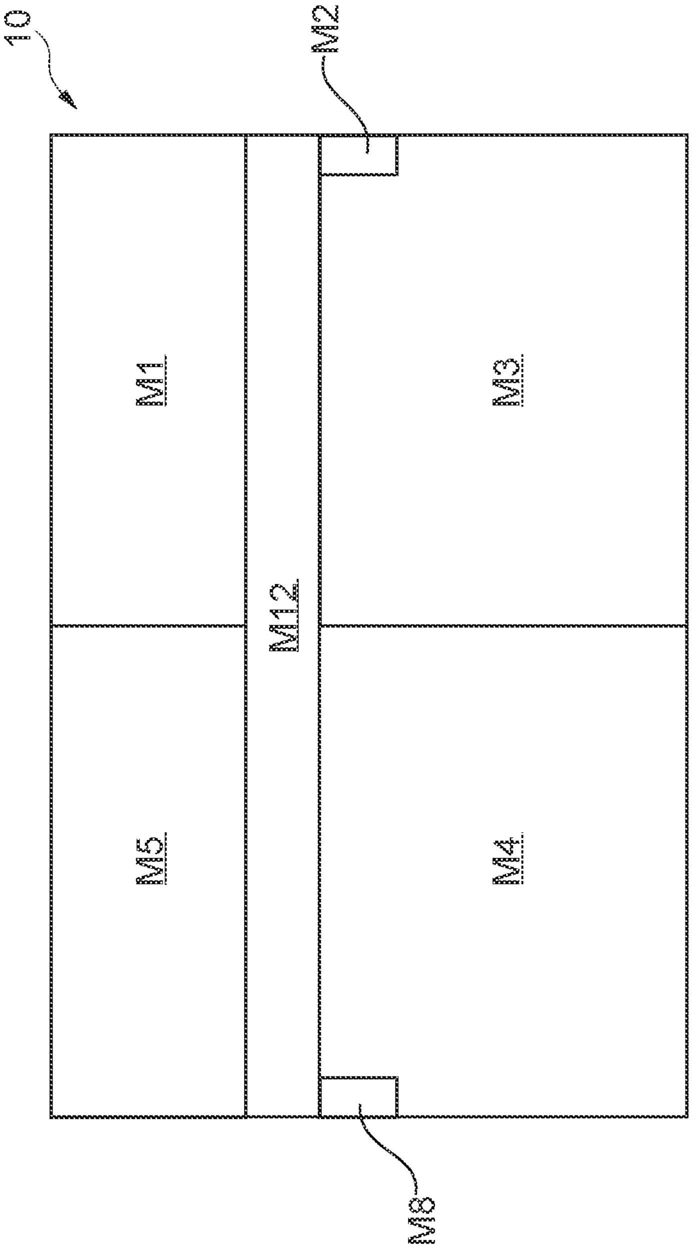
FIG. 5 a simplified, schematic arrangement of modules of an inkjet printing device of a further embodiment.

FIG. 5 shows a simplified schematic arrangement of modules M1, M2, M3, M4, M5, M8, and M12 of the inkjet printing device 10, said modules being arranged in the transport plane of the recording medium 12. In other embodiments, the further modules M6, M7, M9, M10, M11 as shown in FIGS. 1 through 4 can also be arranged at other locations than those indicated there, or be integrated into other modules. The recording medium 12 is guided through each of the modules M1, M2, M3, M4, M5, M8, and M12. These modules thus define a recording medium plane.

In other embodiments, the module M2 can be arranged externally or be integrated into the module M3. Alternatively or additionally, in other embodiments the module M8 can be arranged externally or be integrated into the module M4. The collection pan 17 can be arranged in the module M3, as shown in FIGS. 2 and 4, or be arranged in the module M12 in other embodiments.

Via the arrangement of the modules M1, M2, M3, M4, M5, M8, and M12 as shown in FIG. 5, a smaller space requirement—both in height and in the base area, what is known as the footprint, of the inkjet printing device 10—is necessary in spite of the modular separation of the functions of said inkjet printing device 10. In particular, a development of the inkjet printing device 10 and/or a change to the configuration of the inkjet printing device 10 can be simply achieved by exchanging entire modules M1 through M12 or units 14, 18, 140, 240 of individual modules M1 through M12.

To enable those skilled in the art to better understand the solution of the present disclosure, the technical solution in the embodiments of the present disclosure is described clearly and completely above in conjunction with the drawings in the embodiments of the present disclosure. The embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have" and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

REFERENCE LIST

10 inkjet printing device
12 recording medium
14 printing unit
16 print bar
17 collection pan
18 transfer printing sled
20 rollers
22, 23, rollers
24 deflection roller
26 deflection roller
28 compensation device
30 lever arm
32 pivot axis
40, 140, 240 drying unit
42 inline scanner
44 cooling and deflection roller
46 exhaust channel
50 housing
60, 62, 64, 66 color unit
68 primer unit
70 rinsing fluid unit
142, 242 transport carriage
144, 244 heating element
146, 246 emission region
T transport direction
WP1 maintenance positions
w1 path
w2 height
M1 printing module
M2 traction module, input
M3 buffer module
M4 drying module
M5 electrical module
M6 air exhaust module
M7 cooling module, print heads
M8 traction module, output
M9 cleaning module with wiper unit
M10 fluid management module
M11 cooling module, drying
M12 saddle

The invention claimed is:

1. An inkjet printing device for printing with ink to a recording medium in a form of a web, comprising:

a printing unit comprising a plurality of print bars that respectively have one or more print heads;

a transfer printing sled configured to guide the recording medium, which transfer printing sled is configured to be moved into and out of a space below the printing unit of a printing module; and at least one cleaning element configured to clean at least one print head of the printing unit, wherein, in a print operation state, the transfer printing sled is arranged in the space and guides the recording medium during printing, wherein, in a maintenance operation state, the transfer printing sled is moved out of the space, wherein the recording medium is moved together with the transfer printing sled given a movement of said transfer printing sled from the print operation state into the maintenance operation state and from the maintenance operation state into the print operation state, and wherein, in the transport direction of the recording medium, the at least one cleaning element is arranged laterally next to the space in the print operation state and in the space in the maintenance operation state.

2. The printing device according to claim 1, wherein the printing unit borders the space from above, and a collection pan to capture particles to be captured during cleaning of the print heads with aid of the at least one cleaning element borders the space from below.

3. The printing device according to claim 1, wherein, in the print operation state of the transfer printing sled, the transfer printing sled is configured to be moved out of the space, in the transport direction of the recording medium, and is configured to be moved into the space opposite to the transport direction.

4. The printing device according to claim 3, wherein the transfer printing sled is moved into and out of the space in a motorized manner.

5. The printing device according to claim 1, wherein the printing unit is arranged stationary in the printing device.

6. The printing device according to claim 5, wherein electrical and/or fluid lines are connected to the printing unit, which lines are arranged stationary in a housing of the printing device.

7. The printing device according to claim 1, wherein, in the maintenance operation state, the transfer printing sled is arranged at least partially above a drying unit figured to dry the recording medium printed to with the printing unit, wherein the drying unit comprises at least one heating element.

8. The printing device according to claim 7, wherein an emission region of the heating element is angled sloping downward and/or upward in the transport direction of the recording medium so that the emission region intersects a horizontal plane at an angle.

9. The printing device according to claim 8, wherein the angle is in a range of from 30° to 60°.

10. The printing device according to claim 8, wherein the angle is in a range of from 40° to 50°.

11. The printing device according to claim 8, wherein the recording medium is movable, at least in a region of the heating element, along the emission region or parallel to the emission region.

12. The printing device according to claim 7, wherein the drying unit is a first drying unit; the at least one heating element of the first drying unit is an IR radiant heating element; wherein a second drying unit having at least one second heating element is present, wherein the second heating element is a contact heating element having a heating saddle across which the recording medium is guided; and wherein the first and the second drying units are designed such that the first and the second drying unit are configured to be exchanged with one another by an operator.

13. The printing device according to claim 7, wherein the drying unit comprises a cooling unit having at least one cooling element configured to cool the recording medium after the recording medium passes the heating element of the drying unit.

* * * * *